US006308167B1

(12) United States Patent
Brinkmeyer

(10) Patent No.: US 6,308,167 B1
(45) Date of Patent: Oct. 23, 2001

(54) COMPUTER SYSTEM USING A QUEUING SYSTEM AND METHOD FOR MANAGING A QUEUE AND HETEROGENEOUS DATA STRUCTURES

(75) Inventor: Jay C. Brinkmeyer, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/057,707

(22) Filed: Apr. 9, 1998

(51) Int. Cl.[7] .................................................. G06F 13/00
(52) U.S. Cl. .............................. 707/1; 707/101; 707/102; 707/104; 707/201
(58) Field of Search .................................. 707/1, 2, 3, 5, 707/10, 100, 101, 102, 104, 200, 4, 7, 8, 9; 395/610, 650

(56) References Cited

U.S. PATENT DOCUMENTS

| | | | |
|---|---|---|---|
| 5,386,514 | * 1/1995 | Lary et al. ............................ | 395/250 |
| 5,410,722 | * 4/1995 | Cornaby ............................... | 395/800 |
| 5,574,912 | * 11/1996 | Hu et al. .............................. | 395/650 |
| 5,625,846 | * 4/1997 | Kobayakawa et al. .............. | 395/872 |
| 5,729,749 | * 3/1998 | Ito ........................................ | 395/726 |
| 5,748,954 | * 5/1998 | Mauldin .............................. | 395/610 |
| 5,819,251 | * 10/1998 | Kremer et al. ........................... | 707/1 |
| 5,873,089 | * 2/1999 | Regache et al. ..................... | 707/100 |
| 6,041,053 | * 3/2000 | Douceur et al. ..................... | 370/389 |

OTHER PUBLICATIONS

Mendel, Brett; "Server I/O all set to flow"; *Lantimes*, Oct. 27, 1997, vol. 14, Issue 22; cover page and p. 31.
Briggs, Chris; "Smarter and Faster I/O for Servers"; CORE: Operating Systems; *Byte*, May 1, 1996, vol. 2, No. 5.
Thompson, Tom; "I2O Beats I/O Bottlenecks"; *Byte*, Aug. 1997, pp. 85, 86 and 3 additional pages.
I2O Introduction; Technology Backgrounder; Aug. 13, 1997; http://www.i2osig.org/Architecture/TechBank.html.
i960®RP I/O Processor—the I2O SIG site; http://134.134.214.1/design/iio/i2osig.html; Feb. 6, 1998.
"Welcome to the I2O SIG® Web Site!"; http://www.i2osig.org; Feb. 6, 1998.
"About I2O Technology"; http://www.i2osig.org/Architecture; Feb. 6, 1998.
"Technology Backgrounder"; http://www.i2osig.org/Architecture/TechBack.html; Feb. 6, 1998; 6 pages.
"Questions and Answers"; http://www.i2osig.org/Architecture/QandA.html; Feb. 6, 1998; 4 pages.
"I2O® Specifications For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.
Goble, Scott, et al.; "Intelligent I/O Architecture"; http://www.i2osig.org; Jun. 1996; 22 pages.
"Press Releases and Clips"; http://www.i2osig.org/Press; Feb. 6, 1998; 4 pages.
Listing of Press Releases ; http://altavista.digital.com/cgi-bin/quer . . . =21%2F86&d1=&search.x=46&search.y=6; Feb. 6, 1998; 2 pages.
Crothers, Brooke; "Intel server chip gets big backing", Oct. 7, 1997; http://www.news.com/News/Item/0,4,14962, 00.html; Feb. 6, 1998.

(List continued on next page.)

*Primary Examiner*—Thomas Black
*Assistant Examiner*—Thuy Do

(57) ABSTRACT

A computer system using a queuing system and method for managing a queue having a plurality of generic queue headers connected together by a plurality of links in a predetermined manner. Each generic queue header may be attached to one of a plurality of data structures. The queuing system also includes a library of queue function calls for controlling the operations of each one of the plurality of generic queue headers.

4 Claims, 4 Drawing Sheets

OTHER PUBLICATIONS

"HP Demonstrates Commitment to I2O Standard With New I2O Disk–array Controller", *Hewlett Packard*; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

* cited by examiner

COMPUTER SYSTEM USING A QUEUING SYSTEM AND METHOD FOR MANAGING A QUEUE AND HETEROGENEOUS DATA STRUCTURES

BACKGROUND OF THE INVENTION

1. Technical Field of the Invention

The present invention relates to a computer system having a queuing system for managing a queue and heterogeneous data structures and, in particular, to a queuing system for managing generic queue headers attached to heterogeneous data structures using a library of queue action function calls.

2. Description of Related Art

Software developers currently create application specific queues and queue codes to manage data structures of a particular application. The application specific queues may be referred to by the software developers as scheduler queues, device queues and transaction queues to mention a few. Unfortunately, the queue code of the application specific queue is operable only for a narrow range of applications or tasks, and must be modified and re-tested to be reused in another application.

Currently, the queue code is application specific because queue link information is embedded and interlocked within each data structure of the particular application. The queue link information often includes a pointer to a next queue node and a pointer to a previous queue node. The embedding and interlocking of the queue link information into the data structure requires the software developer or user to manage not only the data structures but also the associated queue link information, which is a complicated undertaking.

Accordingly, there is a need for a queuing system and method for managing generic queue headers attached to heterogeneous data structures using a library of queue action function calls. There is also a need to provide a queuing system and method for enabling a user to manage the data structures of an application without an undue concern about the underlying management of the queue link information. These and other needs are addressed by the queuing system and method of the present invention.

SUMMARY OF THE INVENTION

The present invention is a computer system using a queuing system and method for managing a queue having a plurality of generic queue headers connected together by a plurality of links in a predetermined manner. Each generic queue header may be attached to one of a plurality of data structures. The queuing system also includes a library of queue action function calls for controlling the operations of each one of the plurality of generic queue headers.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
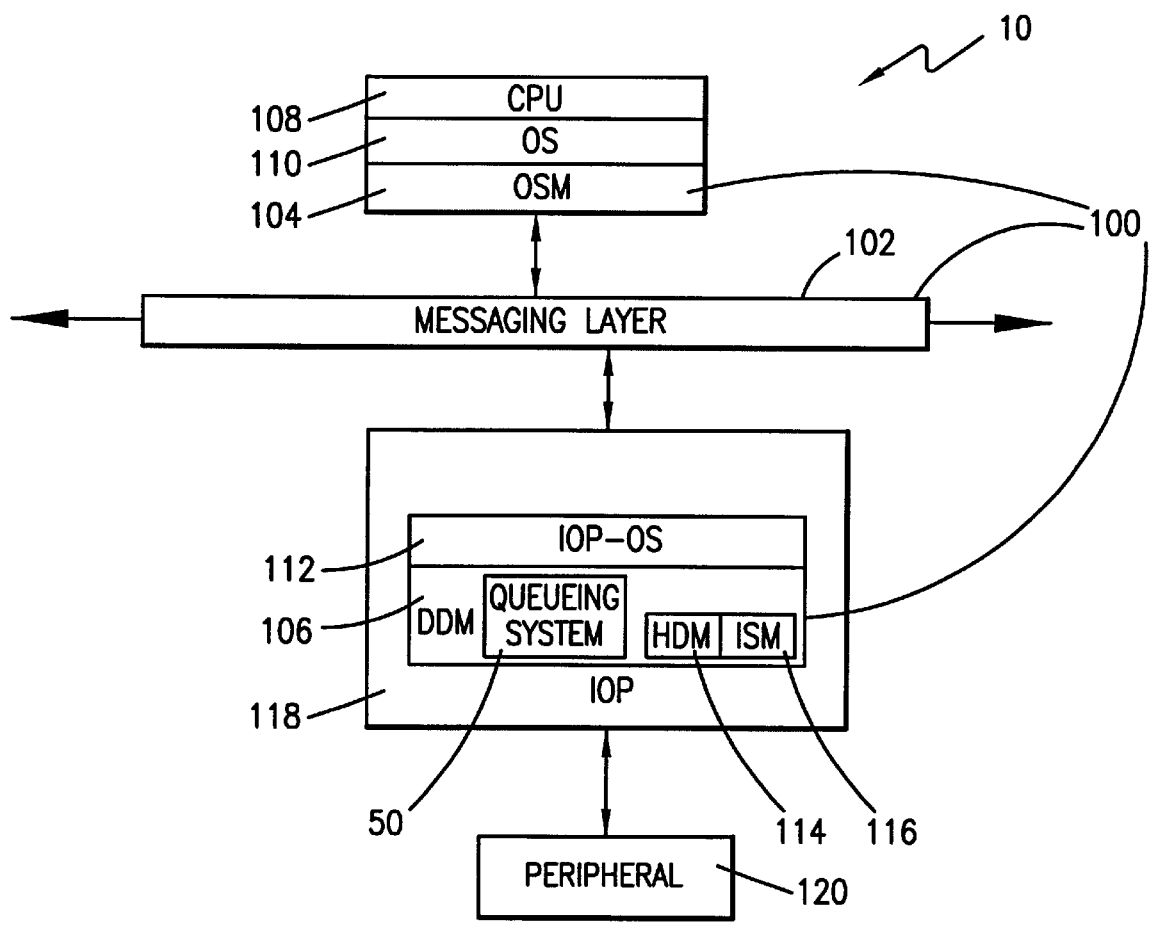
FIG. 1 is a block diagram of an intelligent $I_2O$ architecture having an intelligent $I_2O$ driver incorporating a queuing system of the present invention.

Referring to the Drawings, wherein like numerals represent like parts throughout FIGS. 1–4, there is disclosed a queuing system 50 in accordance with the present invention.

Although two embodiments of the queuing system 50 incorporated within an intelligent $I_2O$ driver 100 will be discussed, those skilled in the art will appreciate that such embodiments may also be incorporated into any operating system, conventional driver or any kind of software within a computer system utilizing queuing functions. Accordingly, the queuing system 50 described should not be construed in a limiting manner.

Referring to FIG. 1, there is shown a block diagram of an intelligent $I_2O$ architecture 10 having the intelligent $I_2O$ driver 100 incorporating the queuing system 50. The intelligent $I_2O$ architecture 10 is well known in the industry and a description of the operation of $I_2O$ technology is available in an Intelligent Input/Output ($I_2O$) specification. The Intelligent Input/Output ($I_2O$) specification, to the fullest extent possible, is hereby incorporated by reference into this specification. Please note that elements associated with the queuing system 50 of the present invention will be more fully discussed with reference to FIGS. 2–3.

The intelligent $I_2O$ architecture 10 utilizes what is known as a "split driver" model which inserts a messaging layer 102 between a portion of the driver 100 specific to the operating system (OS) 110 and the portion of the driver specific to the peripheral 120. The messaging layer 102 splits the driver 100 of a conventional I/O architecture into two separate modules—an Operating System Service Module (OSM) 104 and a Downloadable Driver Module (DDM) 106. The only interaction one module has with another module is through the messaging layer 102 which provides the communication means.

The OSM 104 is the portion the driver 100 that interfaces with the operating system 110 of the computer system which is commonly referred to as the "host operating system". The operating system 110 may include systems sold under the trademarks of NT, UNIX and NETWARE. The operating system 110 is executed by a Central Processing Unit (CPU) 108, and there is generally provided more than one CPU within the intelligent $I_2O$ architecture 10.

The DDM 106 provides a peripheral-specific portion of the driver 100 that interfaces to the peripheral 120. To execute the DDM 106, an Input/Output Processor (IOP) 118 is included in the intelligent $I_2O$ architecture 10. A single IOP 118 may be associated with multiple peripherals 120 and is managed by an IOP operating system (IOP-OS) 112 such as, for example, the integrated $I_2O$ Real-Time Operating System (iRTOS). Therefore, the DDM 106 is executed by the IOP 118 under the management of the IOP-OS 112 to control the peripherals $I_2O$.

The DDM 106 also includes a Hardware Device Module (HDM) 114 which is directly responsible for the control and data transfer associated with the peripheral 120. The DDM 106 may also include a software interface to the HDM 114 known as an Intermediate Service Module (ISM) 116. The ISM 116 is often used for filtering, encoding, and decoding messages to the HDM 114. As mentioned earlier, the queuing system 50 may be located within the OSM 104, OS 110, DDM 106 (shown) or in any kind of software within the computer system that utilizes queuing functions.

Figure 2:
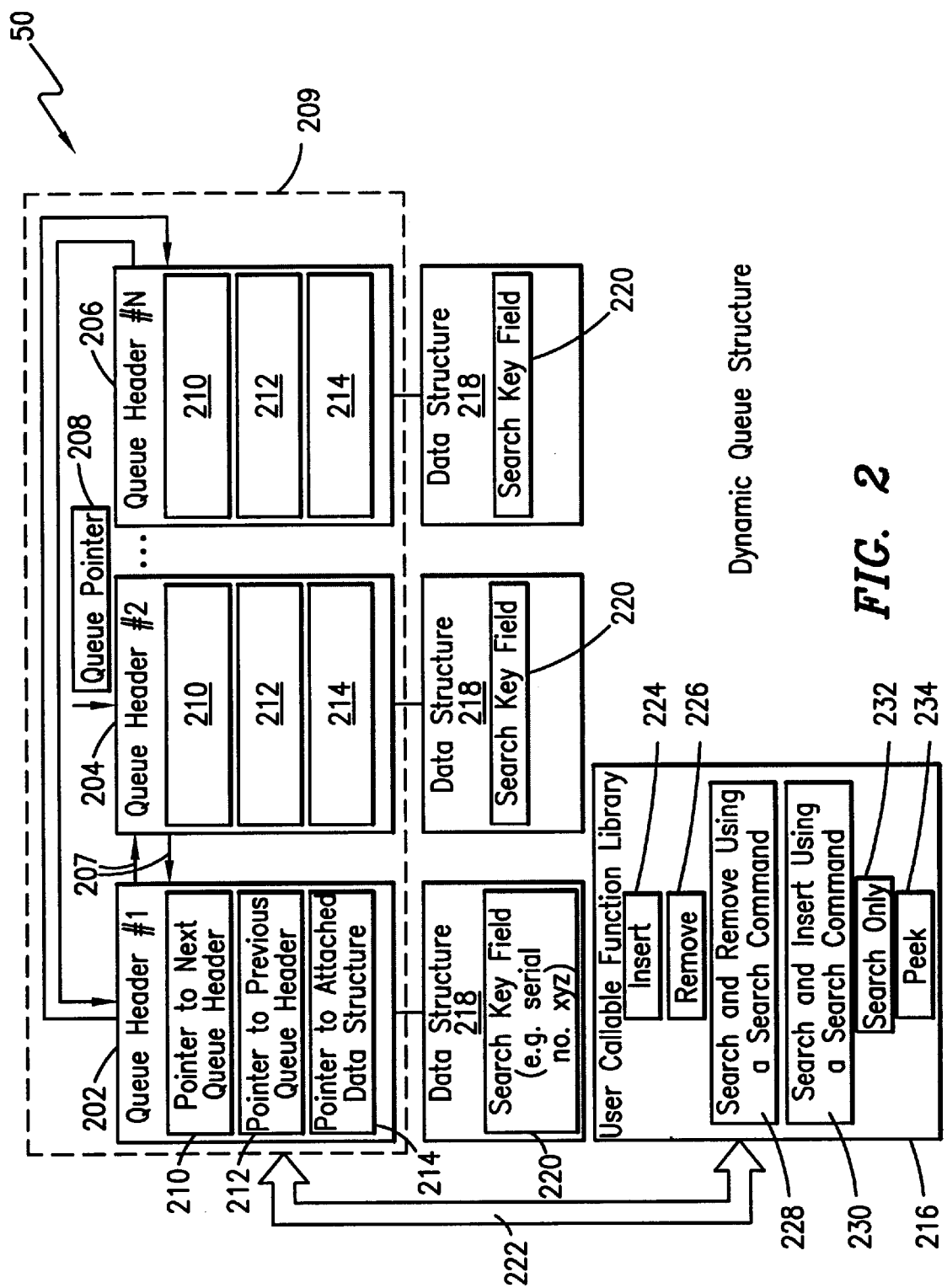
FIG. 2 is a block diagram of a first embodiment of the queuing system of FIG. 1.

Referring to FIG. 2, there is illustrated a first embodiment (dynamic architecture) of the queuing system 50. The dynamic architecture of the queuing system 50 includes a plurality of queue headers 202, 204 and 206 that generally have the same configuration. The queue headers 202, 204 and 206 are connected together by links 207, which may be unidirectional (one arrow) or bi-directional (two arrows) depending on an application. The links 207 connect the plurality of queue headers 202, 204 and 206 in a predetermined manner or form such as a circular queue 209. A queue pointer 208 is used for indicating which queue header 202, 204 or 206 is currently addressed by software within, for example, the intelligent I$_2$O driver 100 (FIG. 1). The total number of queue headers 202, 204 and 206 is limited by the amount of memory.

Each of the queue headers 202, 204 and 206 includes three distinct pointers that may be referred to as: (1) a pointer to next queue header 210; (2) a pointer to previous queue header 212; and (3) a pointer to attached data structure 214. The three distinct pointers function to indicate a position or direction of another queue header and are managed by a library of queue action function calls 216, discussed below.

A multiple of data structures 218 are created and allocated for every application such as spin-up, read/write, and hot plug. Each of the data structures 218 contains transaction information which is generally defined and managed by a software developer or user. For example, the transaction information may be created in response to receiving an I$_2$O SCSI BUS SCAN command that may include subcommands known as testUnitReady-E1, requestSense-E2, inquiry-E3, readCapacity-E4 and startDrive-E5. Also, each data structure 218 includes a search key field 220, which will be discussed later.

The library of queue action function calls 216 operate to manage the queue headers 202, 204 and 206 and is connected via line 222 to the queue headers. Included, in the library of queue action function calls 216 are several discrete function calls used by the software developer or user to effectively manage the queue headers 202, 204 and 206. The discrete function calls include various operations such as insert 224, remove 226, search and remove 228, search and insert 230, search only 232 and peek 234. The user would also need to identify which one of several possible queuing systems 50 is being addressed before using the discrete function calls. Furthermore, it should be understood that the above discrete function calls are exemplary only and other function calls may be utilized by the queuing system 50.

The discrete function calls enables the user to manage the queue headers 202, 204 and 206 without modifying and debugging the queue headers every time another application is called upon to be performed. Furthermore, the user need not know about the structure of the queue headers 202, 204 and 206, because the underlying queue headers and links 207 are managed by the discrete function calls and not by the user.

The user may insert or remove any one of the data structures 218 to or from any one of the queue headers 202, 204 and 206 by invoking the function calls known as insert 224 and remove 226, respectively. To enable the operation of inserting and removing the data structures 218, each discrete function call insert 224 and remove 226 may include the following identifying information: (1) the queue pointer 208 (always required); (2) an opcode identifying the queue header 202, 204 and 206; and (3) the pointer to attached data structure 214.

The user may also insert or remove any specific data structure 218 by invoking the discrete function calls referred to as search and remove 228, and search and insert 230, respectively. The discrete function calls requiring a search to be performed utilize a search command when scanning each data structure 218 attached to the queue headers 202, 204 and 206. The search continues until information associated with the search command matches the search key field 220 which contains the same information, thereafter, the queue function call is performed. Information associated with the search command is generated by the user and may include data such as serial numbers, priority numbers, manufacturer identifiers and pre-failure warranties.

The specific information associated with search key field 220 is not known until the information corresponding with the search command has been defined and entered by the user. For example, the user may want to search for a serial number that would be entered into the search command and then used with the selected discrete function call (e.g., search and remove 228) to find the same number within the search field 220 of the data structure 218. The information associated with the search command is not limited to numbers but may also include alphanumerics or any combination thereof. Also, the search key field 220 may be located anywhere within the data structure 218.

In addition, the user may search and peek at any or all of the data structure 218 by invoking the discrete function calls respectively known as search only 232, and peek 234. The search only 232 function requires the user to use the search command, described above, to locate the data structure 218 having the search key field 220 with the same information that matches the information associated with the search command. The peek 234 function does not require use of the search command and instead enables the user to inspect any of the data structures 218 in a specific order such as next, previous, last or first.

Figure 3:
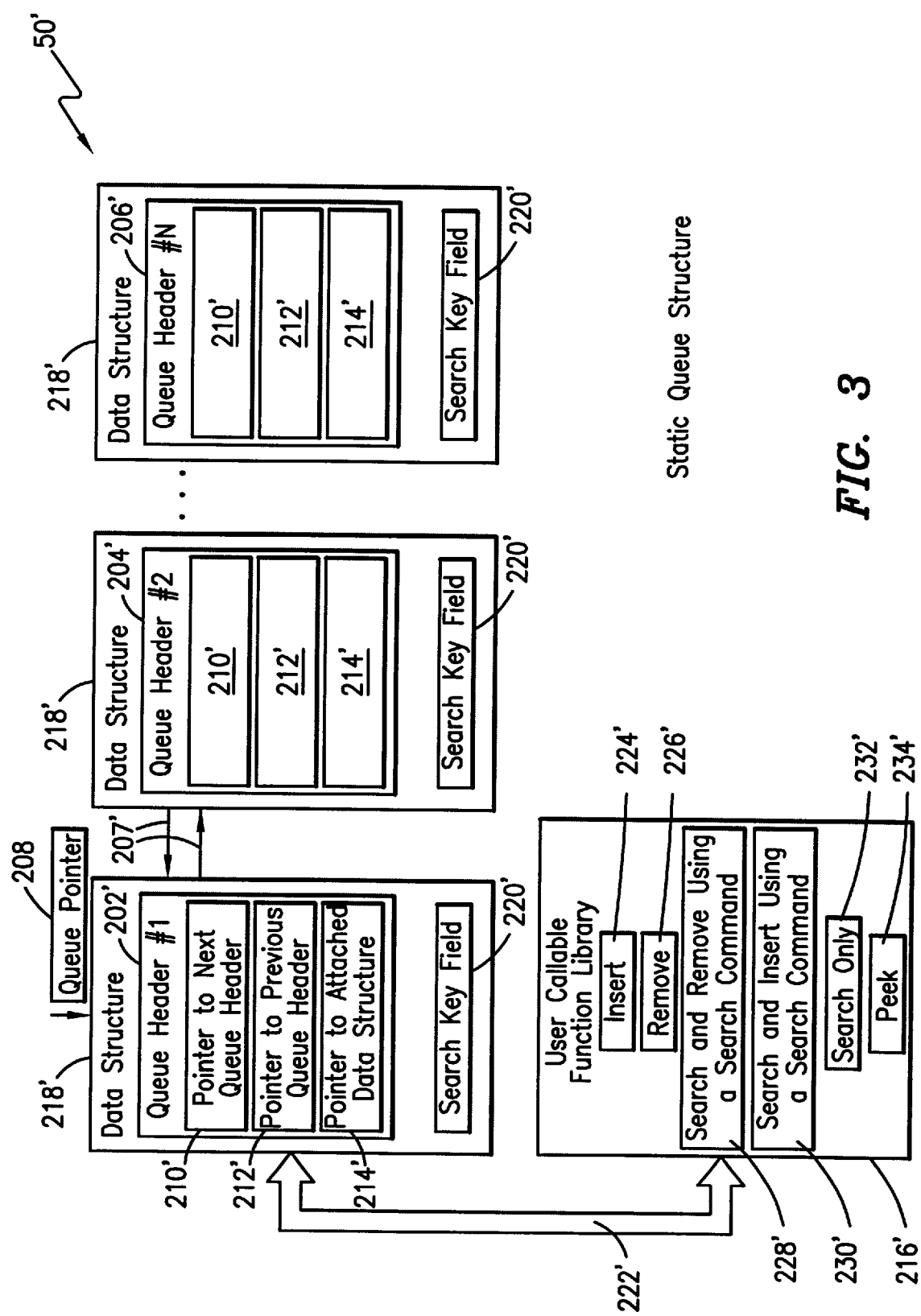
FIG. 3 is a block diagram of a second embodiment of the queuing system of FIG. 1.

Reference is now made to FIG. 3, where a second embodiment (static architecture) of the queuing system 50 is illustrated using prime reference numbers. The queuing system 50' is similar to the first embodiment (dynamic architecture) except for the interaction between the data structure 218' and the queue headers 202', 204' and 206'.

Referring to FIG. 3, there is illustrated a block diagram of the second embodiment (static architecture) of the queuing system 50'. The static architecture of the second embodiment locates each of the queue headers 202', 204' and 206' within a pre-allocated space of the corresponding data structure 218'. In contrast, to the first embodiment where the data structures 218 were attached to the queue headers 202, 204, and 206 (FIG. 2). The data structures 218' also contain the transaction information (e.g., textUnitReady El) as discussed earlier with respect to the first embodiment.

The data structures 218' incorporating the queue headers 202', 204' and 206' are connected together by links 207', which may be unidirectional (one arrow) or bi-directional (two arrows) depending on the application. The links 207' effectively connect the plurality of queue header 202', 204' and 206' and the data structures 218' in a predetermined manner. As mentioned earlier, the queue pointer 208' is used for indicating which data structure 218' is currently addressed by the software.

The queue headers 202', 204' and 206' also include the three distinct pointers known as (1) the pointer to next queue header 210'; (2) the pointer to previous queue header 212'; and (3) the pointer to attached data structure 214'. The three distinct pointers function as they did in the first embodiment and are managed by the library of queue action function calls 216'. The library of queue action function calls 216' is connected by line 222' to the data structures 218' incorporating the queue headers 202', 204' and 206'.

As described above, the library of queue action function calls 216' manages the queue headers 202', 204' and 206' via several discrete function calls such as insert 224', remove 226', search and remove 228', search and insert 230', search only 232' and peek 234'. The specifics associated with the discrete function calls and the search key field 220' were described in reference to the first embodiment. and for clarity will not be repeated.

The static architecture of the queuing system 50' may be utilized where speed or fast performance is desired over the convenience of being able to dynamically allocate the data structures 218 as is possible with the dynamic architecture of the first embodiment.

Figure 4:
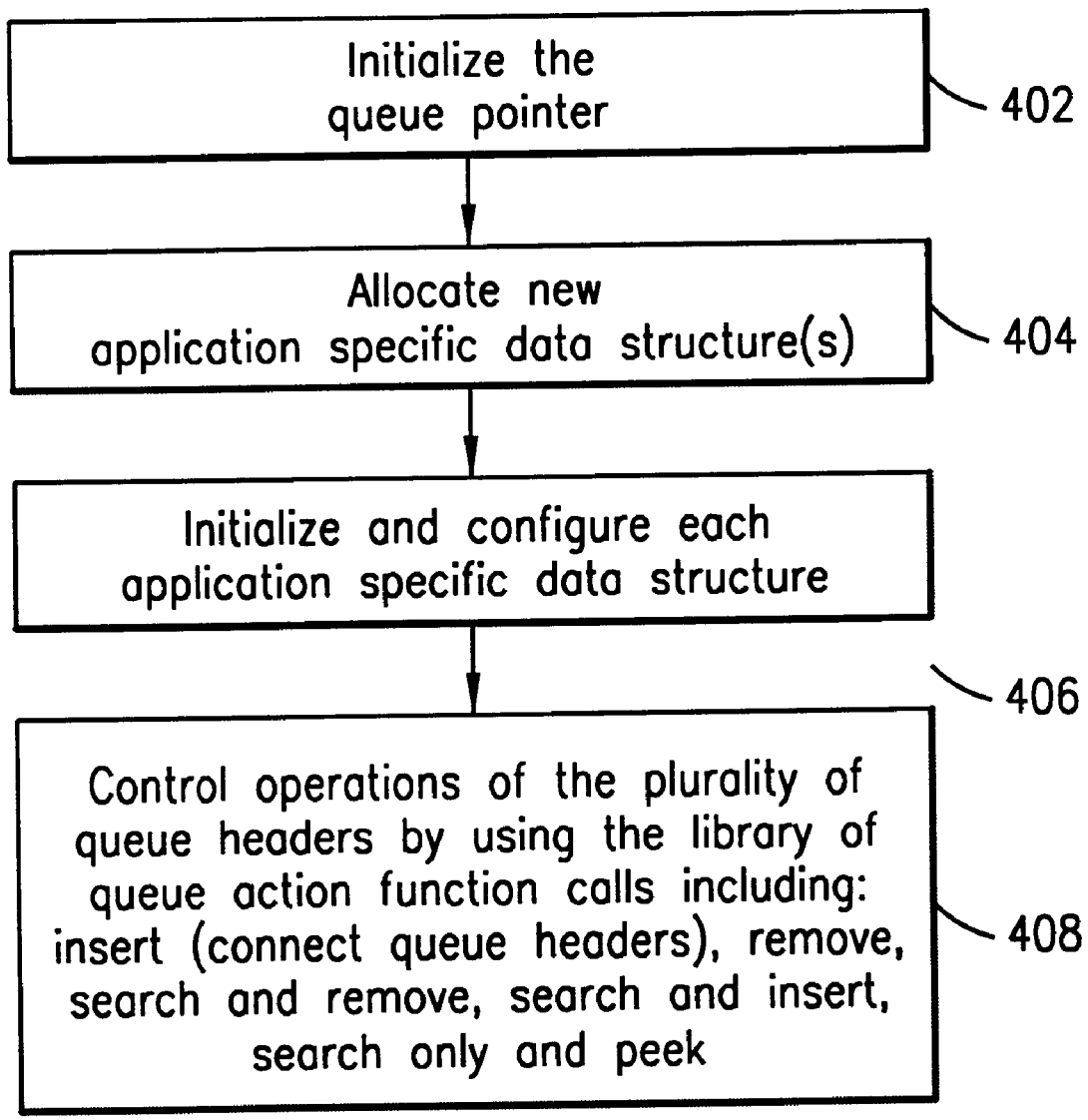
FIG. 4 is a simplified flow diagram of an operation of the queuing system.

Referring to FIG. 4, there is illustrated a simplified flow diagram of an operation of the queuing 20 system 50 used in the computer system. As discussed earlier, the operation of the two embodiments of the queuing system 50 may be performed within the intelligent $I_2O$ architecture 10 (FIG. 1) or within any kind of software utilizing queuing functions.

Beginning at stage 402, the user initializes the queue pointer 208 within one of the queuing systems 50 created to operate as, for example, a transaction queue, scheduler queue or device queue.

At stage 404, each data structure 218 is allocated and attached to one of the queue headers 202, 204 and 206. However, within the static architecture there is no requirement to allocate the data structures 218, because the queue headers 202, 204 and 206 are already positioned within the data structures.

At stage 406, each allocated data structure 218 is then initialized and configured by the user to contain transaction information for a specific application such as spin-up, hot plug or read/write.

At stage 408, the user would use the library of queue action function calls 216 to manage the queue headers 202, 204 and 206; for example, the insert 224 function may be used to connect together the queue headers 202, 204 and 206. The search command discussed earlier may also be required in addition to the discrete function calls to manage the queue headers 202, 204 and 206. The user does not need to know about the structure of the queue headers 202, 204 and 206, because the underlying queue headers and links 207 are effectively managed by the discrete function calls of the library of queue action function calls 216.

As mentioned earlier, the user in controlling the operations of the queue headers 202, 204 and 206 would Iutilize discrete function calls from the library of queue action function calls 216 in addition to any necessary search commands. The discrete function calls include operations such as insert 224, remove 226, search and remove 228, search and insert 230, search only 232 and peek 234. The user would likely need to identify which specific queuing system 50 is being addressed before using the discrete function calls.

From the foregoing, it can be readily appreciated by those skilled in the art that the present invention provides a computer system having a queuing system using a library of queue action function calls to manage generic queue headers that are attached or incorporated into the heterogeneous data structures. Also, the queuing system as disclosed may be utilized by the user in different applications without requiring extensive modifications and debugging of the generic queue headers. Furthermore, the queuing system as disclosed may be incorporated into any operating system or software requiring a queuing function.

Although two embodiments of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A computer system using a queuing system for managing a queue, the queuing system comprising:
   a plurality of generic queue headers;
   a plurality of links for connecting the generic queue headers in predetermined manner;
   a plurality of data structures, each data structure attached to one of the generic queue headers; and
   a plurality of queue function calls for controlling operations of the plurality of generic queue headers, wherein each link connecting a pair of the generic queue headers is uni-directional.

2. A computer system using a queuing system for managing a queue, the queuing system comprising:
   a plurality of generic queue headers;
   a plurality of links for connecting the generic queue headers in predetermined manner;
   a plurality of data structures, each data structure attached to one of the generic queue headers; and
   a plurality of queue function calls for controlling operations of the plurality of generic queue headers, wherein each link connecting a pair of the generic queue headers is bi-directional.

3. A queuing system used in an intelligent $I_2O$ driver of a computer system for managing a queue, the queuing system comprising:
   a plurality of queue headers;
   a plurality of links for connecting the queue headers in a predetermined manner;
   a plurality of data structures, each data structure attached to one of the queue headers; and
   a plurality of queue action function calls for controlling operations of the plurality of queue headers, wherein each link connecting a pair of the queue headers is uni-directional.

4. A queuing system used in an intelligent $I_2O$ driver of a computer system for managing a queue, the queuing system comprising:
   a plurality of queue headers;
   a plurality of links for connecting the queue headers in a predetermined manner;
   a plurality of data structures, each data structure attached to one of the queue headers; and
   a plurality of queue action function calls for controlling operations of the plurality of queue headers, wherein each link connecting a pair of the queue headers is bi-directional.

* * * * *